April 4, 1944.                R. A. FORESMAN                2,346,069
                              VALVE CONSTRUCTION
                              Filed Jan. 8, 1943            2 Sheets-Sheet 1

WITNESSES:                                          INVENTOR
                                                ROBERT A. FORESMAN
                                                BY
                                                    ATTORNEY

April 4, 1944.   R. A. FORESMAN   2,346,069
VALVE CONSTRUCTION
Filed Jan. 8, 1943   2 Sheets-Sheet 2

WITNESSES:

INVENTOR
*Robert A. Foresman*
BY
ATTORNEY

Patented Apr. 4, 1944

2,346,069

UNITED STATES PATENT OFFICE 2,346,069

VALVE CONSTRUCTION

Robert A. Foresman, Prospect Park, Pa., assignor to Westinghouse Electric & Manufacturing Company, East Pittsburgh, Pa., a corporation of Pennsylvania Application January 8, 1943, Serial No. 471,669

4 Claims. (Cl. 137—68)

The invention relates to valve structures, more particularly to valves for use with liquid containers, and has for an object to provide improved valves of this type.

Another object of the invention is to provide a buoyant valve member.

A further object of the invention is to provide a hollow valve structure whose buoyancy may be increased and decreased.

Yet another object of the invention is to provide a closure for a liquid container wherein the sealing pressure of the closure increases with increase in pressure of the liquid within the container.

These and other objects are effected by the invention as will be apparent from the following description and claims taken in connection with the accompanying drawings, forming a part of this application, in which:

Figure 1:
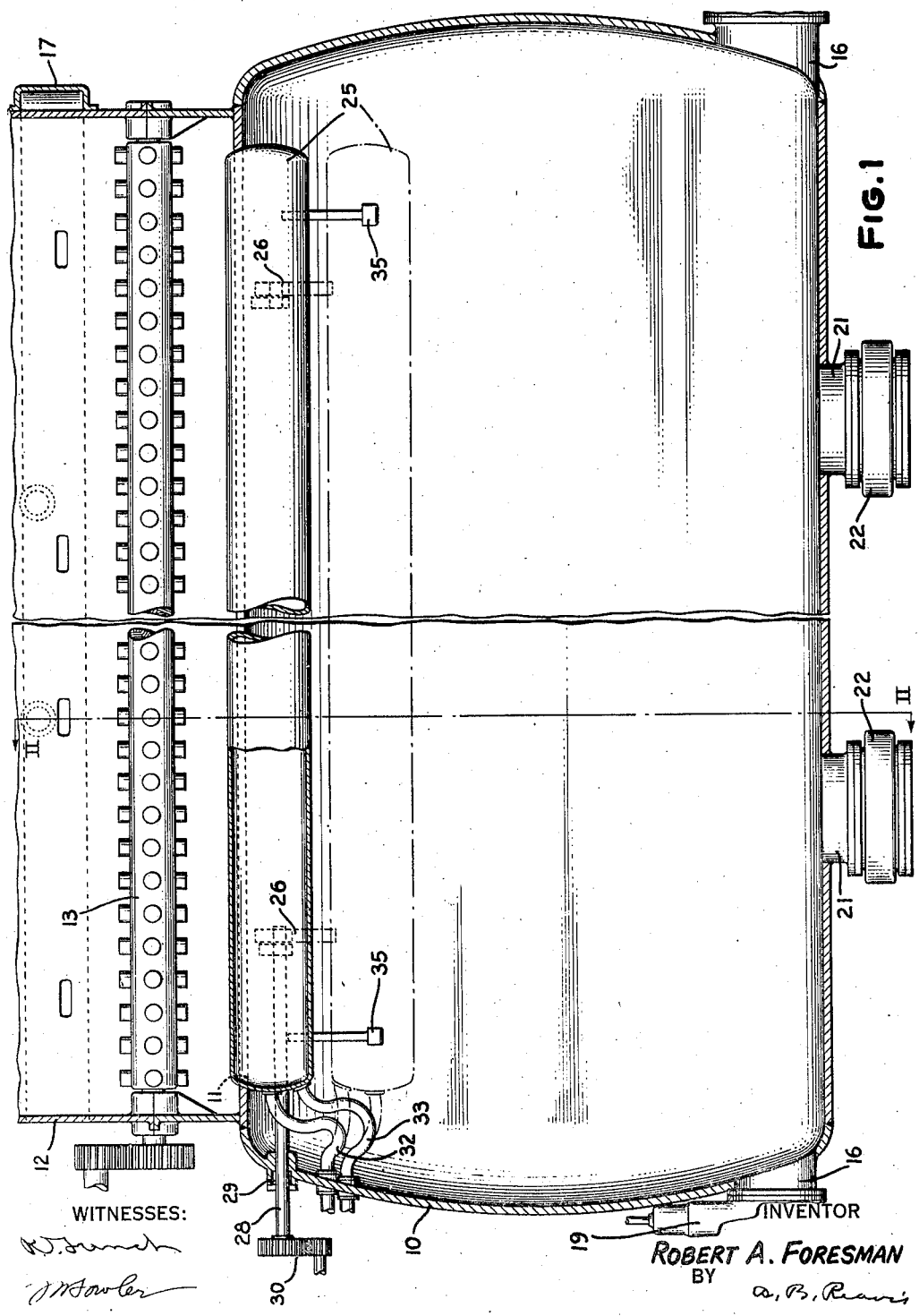
Fig. 1 is a longitudinal sectional view taken along the line I—I of Fig. 2, looking in the direction indicated by the arrows.

Referring now to the drawings more in detail, there is shown a horizontally-disposed cylindrical closed tank 10 which, when used for collecting refuse from furnaces, may be, for example, of a size in the order of 6 or 8 feet in diameter and 25 or 35 feet in length. A relatively narrow inlet opening 11 is provided in the upper wall of the tank 10 and preferably extends for a major portion of the length thereof to provide for admission to the tank of refuse from the ash pit 12 positioned thereabove and adapted to receive ash and other refuse discharged from a furnace (not shown). The ash pit 12 may be provided with clinker grinder rolls 13 to reduce the refuse to a size suitable for handling in the tank 10, in the manner hereinafter related. Guide plates 14 may be positioned within the ash pit to provide a converging passage to the opening 11 into the tank 10.

As shown in Fig. 1, the tank is provided with supply conduits 16 at either end adjacent the bottom thereof, whereby liquid (preferably water) may be supplied to the tank to fill the latter and the lower portion of the ash pit 12 to a level determined by the water seal structure 17 and its associated overflow conduit 18. It will be apparent that this arrangement maintains the clinker grinder rolls 13 submerged in water, whereby they are prevented from overheating by contact with hot ash or refuse from the furnace.

The liquid seal structure 17 serves to prevent ingress of air through the overflow conduit 18 to the interior of the ash pit 12 and the associated furnace thereabove, thereby avoiding any adverse effects that such leakage of air might have upon the operation of the furnace.

The supply conduits 16 are provided with valves 19, whereby, when the tank has been filled to the level determined by the overflow conduit 18, the supply of water to the tank may be reduced to the minimum necessary to keep the tank filled.

Figure 2:
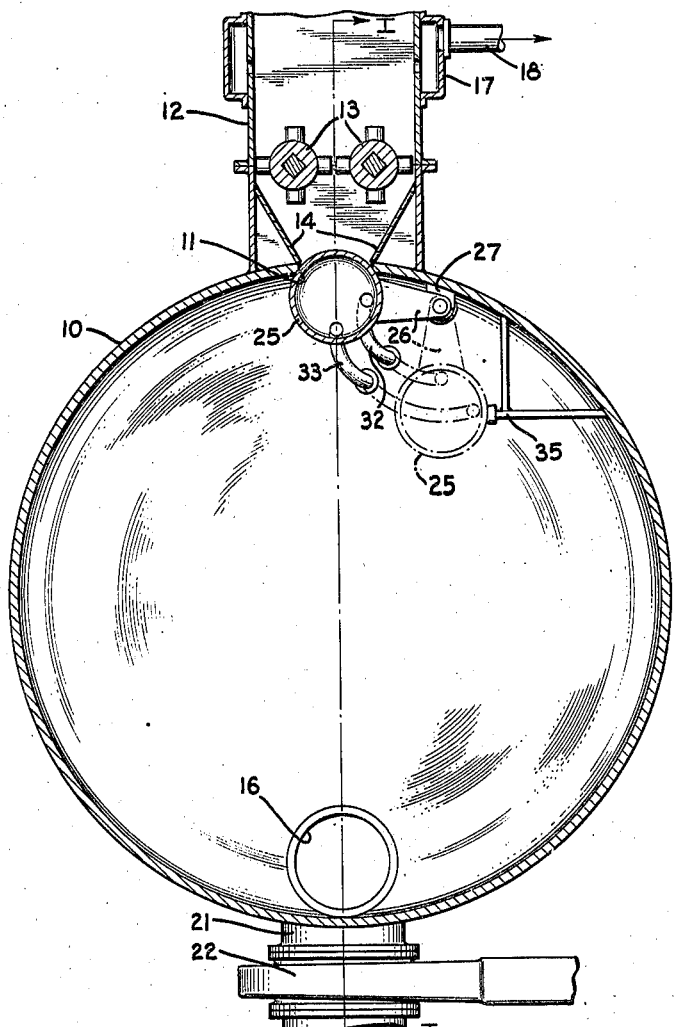
Fig. 2 is a transverse sectional view taken along the line II—II of Fig. 1, looking in the direction indicated by the arrows; and, Fig. 3 is a fragmentary sectional view similar to Fig. 2, but showing a modified construction.

In order that the apparatus may operate in the manner hereinafter described, there is provided a valve structure 25 in the form of a relatively long and narrow cylindrical tank 25 of such size as to completely obstruct the inlet opening 11 of the tank 10 when the valve 25 is in its upper, or closing, position (Fig. 2). The valve 25 is carried by arms 26 pivotally connected to brackets 27 on the interior wall of the tank 10, whereby the valve may have pivotal movement about the brackets 27 between the closing position, shown in full lines in Fig. 2, and the fully open position, shown in dotted lines in that figure.

As best shown in Fig. 1, one of the pins, providing the pivotal connection between the arms 26 and the brackets 27, is in the form of an elongated shaft 28 extending through a stuffing box 29 in the adjacent end wall of the tank 10, with its terminal portion projecting exteriorly of the tank. Suitable means, for example, the gearing 30, may be associated with the projecting end of the shaft 28, whereby, with the inner end of the shaft rigidly secured to the arm 26, the valve member 25 may be moved from open to closed position, and vice versa, from externally of the tank 10.

A pair of flexible conduits 32 and 33 provide communication between the hollow interior of the valve member 25 and the exterior of the tank 10, so that liquid may be supplied to, or withdrawn from, the valve member, with the result that the latter's buoyancy may be increased or decreased at will.

If desired, a stop structure 35 may be provided within the tank to limit opening movement of the valve member 25 to prevent movement thereof past vertical dead center with respect to its pivotal axis, so that, with the valve in open position and submerged in water in the tank, as shown in dotted lines in Fig. 2, if liquid within the valve 25 is withdrawn through the conduit 33, the resulting buoyancy of the valve will cause it to automatically rise to its upper closing position with respect to the opening 11. Conversely, with the valve maintained in closing position due to its buoyancy, liquid may be supplied thereinto through the conduit 32 to render it nonbuoyant, whereupon gravitational force acting thereon results in opening movement.

The structure illustrated herein is intended to be operated in the following manner: With the valve 25 in open position and the tank and ash pit filled with water to the level of the overflow conduit 18, ash and other refuse from the furnace (not shown), discharged to the ash pit 12, will be reduced in size by the clinker grinder rolls 13 and discharged through the opening 11 into the tank 10. When the quantity of material within the tank has reached predetermined limits, the valve 25 is moved to closing position either by operation of the gearing 30 and consequent rotation of the shaft 28 or by removing liquid from the valve 25 to render the latter sufficiently buoyant to rise to closing position without manual operation of the shaft 28. Obviously, the two methods of moving the valve may be combined and, in any event, once the valve is in closing position it would be preferable to remove the liquid therefrom in order that the buoyancy thereof will provide increased sealing pressure between the valve 25 and the edge of the opening 11 against which the valve seats.

With the valve 25 in closing position, the valves 22 in the discharge conduits 21 will be opened to provide for discharge of water and solid materials from the tank 10. At the same time, one or both of the valves 19 in the supply conduit 16 will be opened to provide entry of streams of water to not only flow across the bottom of the tank toward the discharge conduits 21 to thereby flush the tank, but also to agitate and render fluent the mixture of solids and liquid within the tank. It will be obvious to those skilled in the art that the particular combination of supply and discharge conduits in operation at one time may be varied in accordance with the particular requirements resulting from changes in operating conditions; such changes involving variations in size and nature of the material in the tank and variations in pressure of water supplied through the conduits 16.

Figure 3:
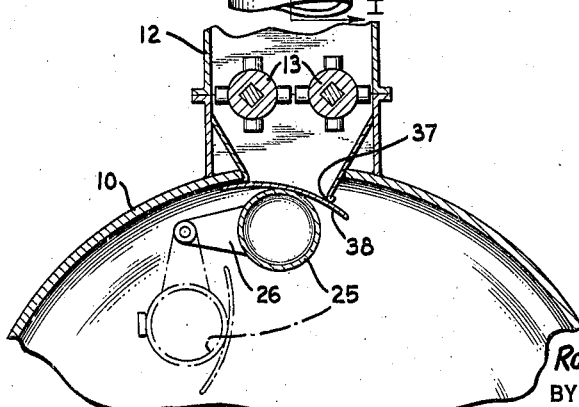

In Fig. 3, there is illustrated a modification of the valve structure for closing the inlet opening 37; the valve structure in this arrangement comprising the same cylindrical valve member 25, the latter having attached thereto, as by welding, a resilient member 38 which, in the arrangement herein illustrated, is a metal plate providing flexible portions for contact with the edges of the opening 37 providing the valve seat. This valve may be rendered buoyant or nonbuoyant in the same manner as in the previously-described construction, and the operation thereof is identical.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. Apparatus of the character described comprising a closed tank having a relatively long and narrow inlet opening in its top wall; a long and narrow closed cylindrical closure member for said opening, said cylindrical closure member being of a greater diameter than the width of the opening; means for filling the tank with liquid; means for supplying liquid to and withdrawing liquid from the interior of the closure member to render the latter heavy or buoyant for moving it to open or closed positions; and means for guiding said closure member during such movement.

2. Apparatus of the character described comprising a closed tank adapted to be filled with liquid and having an inlet opening in its top wall; a hollow closure member for said opening, said member being larger than said opening and positioned within the tank for sealing engagement with said opening; and means for supplying gaseous medium to the interior of said hollow member to render the member buoyant, whereby when the tank is filled with liquid the buoyancy of the closure member therein urges the member into sealing engagement with the edges of the tank inlet opening.

3. Structure as specified in claim 2, wherein the closure member includes a flexible portion adapted to be urged into sealing engagement with the edges of the tank inlet opening by the buoyancy of the member.

4. Apparatus of the character described comprising a horizontally-disposed cylindrical tank having a relatively long and narrow opening in its top wall; a valve member for closing said opening comprising a hollow cylindrical member of a length and diameter slightly greater than the length and width of the opening; means mounting the valve within the tank for pivotal movement about an axis parallel to the major axis of the opening between a first upper position with the valve closing the opening and a second lower position with the valve uncovering the opening; means operable externally of the tank for swinging the valve about its pivotal axis between said first and second positions; means for filling the tank with liquid; and means for varying the buoyancy of the valve, said means comprising a conduit providing communication between the interior of the valve and the exterior of the tank, whereby liquid may be supplied to or withdrawn from the interior of the valve.

ROBERT A. FORESMAN.